United States Patent
Tsai et al.

(10) Patent No.: US 8,339,757 B2
(45) Date of Patent: Dec. 25, 2012

(54) ELECTROSTATIC DISCHARGE CIRCUIT FOR INTEGRATED CIRCUIT WITH MULTIPLE POWER DOMAIN

(75) Inventors: Fu-Yi Tsai, Hsinchu (TW); Ming-Dou Ker, Hsinchu County (TW)

(73) Assignee: Faraday Technology Corp., Science-Based Industrial Park, Hsin-Chu (TW)

( * ) Notice: Subject to any disclaimer, the term of this patent is extended or adjusted under 35 U.S.C. 154(b) by 414 days.

(21) Appl. No.: 12/762,369

(22) Filed: Apr. 19, 2010

(65) Prior Publication Data
US 2011/0255200 A1    Oct. 20, 2011

(51) Int. Cl.
*H02H 9/00* (2006.01)
(52) U.S. Cl. .......................................... 361/56; 361/111
(58) Field of Classification Search .................. 361/56, 361/91.1, 111
See application file for complete search history.

(56) References Cited

U.S. PATENT DOCUMENTS

| | | | | |
|---|---|---|---|---|
| 5,679,971 A * | 10/1997 | Tamba et al. | ............... | 257/357 |
| 6,014,298 A * | 1/2000 | Yu | .................. | 361/56 |
| 6,624,992 B1 * | 9/2003 | Aparin | ........................ | 361/56 |
| 6,762,086 B2 * | 7/2004 | Oh | ................................ | 438/199 |
| 7,692,907 B2 * | 4/2010 | Chen et al. | ................. | 361/56 |
| 7,827,512 B2 * | 11/2010 | Minesaki | ................... | 716/133 |
| 7,869,174 B2 * | 1/2011 | Tanaka et al. | ................. | 361/56 |

* cited by examiner

*Primary Examiner* — Rexford Barnie
*Assistant Examiner* — Tien Mai
(74) *Attorney, Agent, or Firm* — Winston Hsu; Scott Margo

(57) ABSTRACT

An ESD protection circuit with multiple domains, which comprises: an ESD protection device, coupled between a first power supplying line and a first ground line; a first internal circuit, having a first terminal coupled to the first power supplying line; a first switch, coupled between a second terminal of the first internal circuit and a second ground line; and a first ESD detection circuit, coupled to the first switch, for detecting an ESD signal, and controls the first switch to be non-conductive when the ESD signal occurs.

14 Claims, 11 Drawing Sheets

ELECTROSTATIC DISCHARGE CIRCUIT FOR INTEGRATED CIRCUIT WITH MULTIPLE POWER DOMAIN

BACKGROUND OF THE INVENTION

1. Field of the Invention

The present invention relates to an ESD (Electrostatic Discharge) protection circuit with multiple power domain, and particularly relates to an ESD protection circuit with multiple power domain, which can controls an internal circuit to be non-conductive with a power supplying line or a ground line while detecting an ESD signal.

2. Description of the Prior Art

Normally, an ESD protection mechanism, which is always provided for an internal region of an integration circuit, always locates between an I/O pad and an internal circuit. However, the integration circuit may have a plurality of power domains, and an ESD phenomenon may occur at interfaces between different power domains. Also, in a high speed circuit, a gate oxide of a MOSFET is always thinner, thus a current may easily penetrate the oxide and damage the circuit. Some integration circuits may have ESD protection devices located in signal transmission paths of the power domains. However, such devices may cause the delay of signals and can not meet the high speed requirement of the circuits.

SUMMARY OF THE INVENTION

One objective of the present invention is to provide an ESD protection mechanism for a circuit of different power domains.

Another objective of the present invention is to provide an ESD protection mechanism not in signal transmission paths.

One embodiment of the present invention provides an ESD protection circuit with multiple domains, which comprises: an ESD protection device, coupled between a first power supplying line and a first ground line; a first internal circuit, having a first terminal coupled to the first power supplying line; a first switch, coupled between a second terminal of the first internal circuit and a second ground line; and a first ESD detection circuit, coupled to the first switch, for detecting an ESD signal, and controls the first switch to be non-conductive when the ESD signal occurs.

Another embodiment of the present invention provides an integration circuit with rush current protection mechanism, which comprises: a first circuit to be protected, having a first terminal coupled to a first power supplying line; a first switch, coupled between a second terminal of the first circuit to be protected and a second ground line; and a first rush current detection circuit, coupled to the first switch, for detecting an ESD signal, and controls the first switch to be non-conductive when the ESD signal occurs.

According to above-mentioned embodiments, ESD protection mechanism for a circuit of different power domains can be provided. Also, the protection device does not locate in signal transmission paths. By this way, the signal delay problem can be avoided.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections. Besides, if the term "a first apparatus", "a second apparatus" or similar terms are utilized in the specification and following claims, it does not mean that the sequence of the apparatuses but only means that the apparatuses are different ones.

Figure 1A:
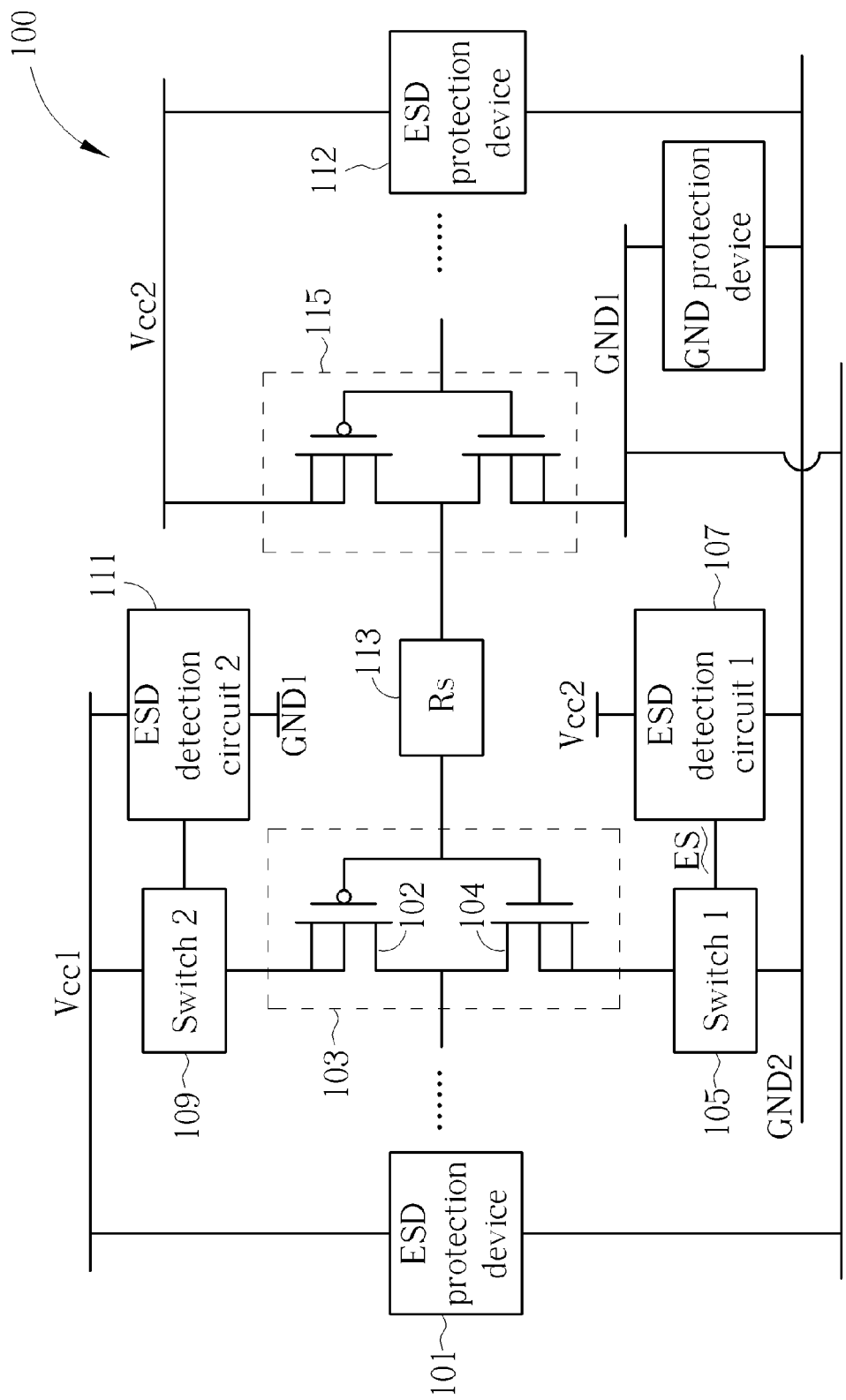
FIGS. 1-4 illustrate a circuit diagram of an ESD protection circuit with multiple domains according to an embodiment of the present application.

FIGS. 1a, 1b, 2a, 2b, 3a, 3b and 4 illustrate circuit diagrams of an ESD protection circuit 100 with multiple domains according to embodiments of the present application. As shown in FIG. 1a, the ESD protection circuit 100 with multiple domains includes: an ESD protection device 101, a first internal circuit 103 (i.e. a circuit to be protected), a first switch 105 marked as a switch 1, a first ESD detection 107 marked as ESD detection circuit 1, a second switch 109 marked as a switch 2, and a second ESD detection circuit 111 marked as an ESD detection circuit 2. The ESD protection device 101 is coupled between the first power supplying line $V_{cc1}$ and a first ground line GND1. The first internal circuit 103 is coupled between a first power supplying line $V_{cc1}$ and a second ground line GND2 and can be regarded as a power domain. Also, a second internal circuit 115 is coupled between a second power supplying line $V_{cc2}$ and a first Ground line GND1 and can be regarded as another power domain. The first internal circuit 103 includes a first terminal coupled to the first power supplying line $V_{cc1}$. The first switch 105 is coupled between a second terminal of the first internal circuit 103 and the second ground line GND2. The first ESD detection circuit 107 is coupled to the switch 105, for detecting an ESD signal (ex. a rush voltage or a rush current), and for controlling the first switch 105 to be non-conductive when the ESD signal occurs. Similarly, the second switch 109 is coupled between the first internal circuit 103 and the first power supplying line $V_{cc1}$. The second ESD detection circuit 111 is coupled to the second switch 109, for detecting the ESD signal (ex. a rush voltage or a rush current), and for outputting an ESD informing signal ES to control the second switch 109 to be non-conductive when the ESD signal occurs. By this way, it can be avoided that the ESD current flows through a delay device 113 (ex. parasitic resistance of the signal line, or an external resistor in order to meet the requirement corresponding to the circuit operation speed) to the second inter circuit 115 to penetrate the gate oxide layer of the MOSFET of the second internal circuit 115. Additionally, since the first switch 105, the second switch 109, the second detection circuit 107 and the second ESD detection circuit 111 are not in the signal transmission path (i.e. a signal interface between the power domains first internal circuit 103 and the second internal circuit 115), the signal delay problem in prior art can be avoided.

Figure 1B:
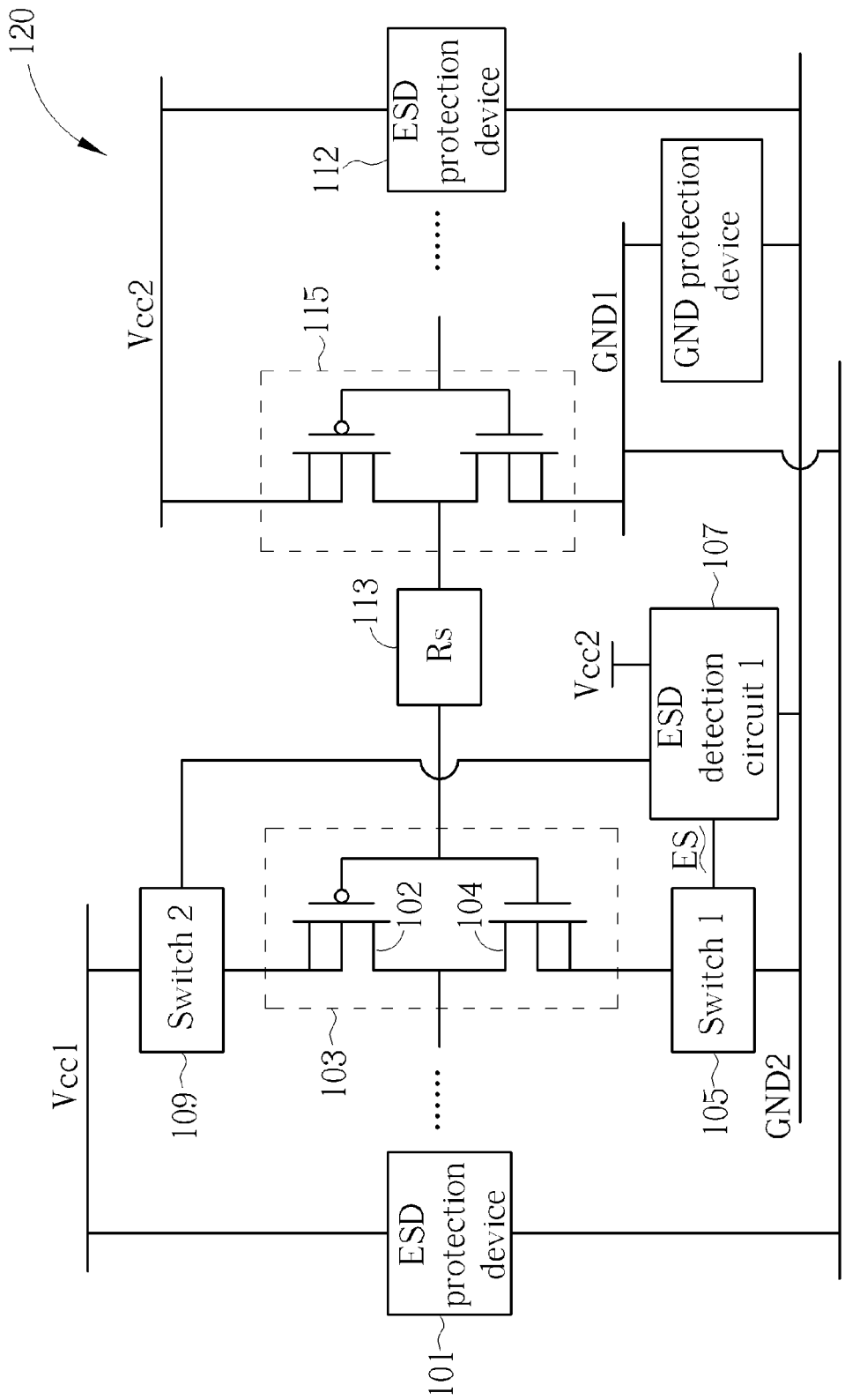

The ESD protection circuit 120 with multiple domains in FIG. 1b has devices almost the same as which of the ESD protection circuit 100 with multiple domains in FIG. 1a. One of the differences is that the second ESD detection circuit 111 shown in FIG. 1b is omitted. Besides, the ESD protection circuit 120 with multiple domains utilizes the first ESD detection circuit 107 to simultaneously control the first switch 105 and the second switch 109. Accordingly, the first ESD detection circuit 107 controls the first switch 105 and the second switch 109 to be non-conductive when it detects the ESD signal. Therefore, it can be avoided that the ESD current flows to the second internal circuit 115 and flows through the delay device 113 (ex. a resistor) to penetrate the gate oxide layer of the MOSFET of the second internal circuit 115. Other detail technique features are already disclosed in FIG. 1b, thus it is omitted for brevity. In above mentioned embodiments, the first internal circuit 103 includes a PMOS 102 and a NMOS 104.

Figure 2A:
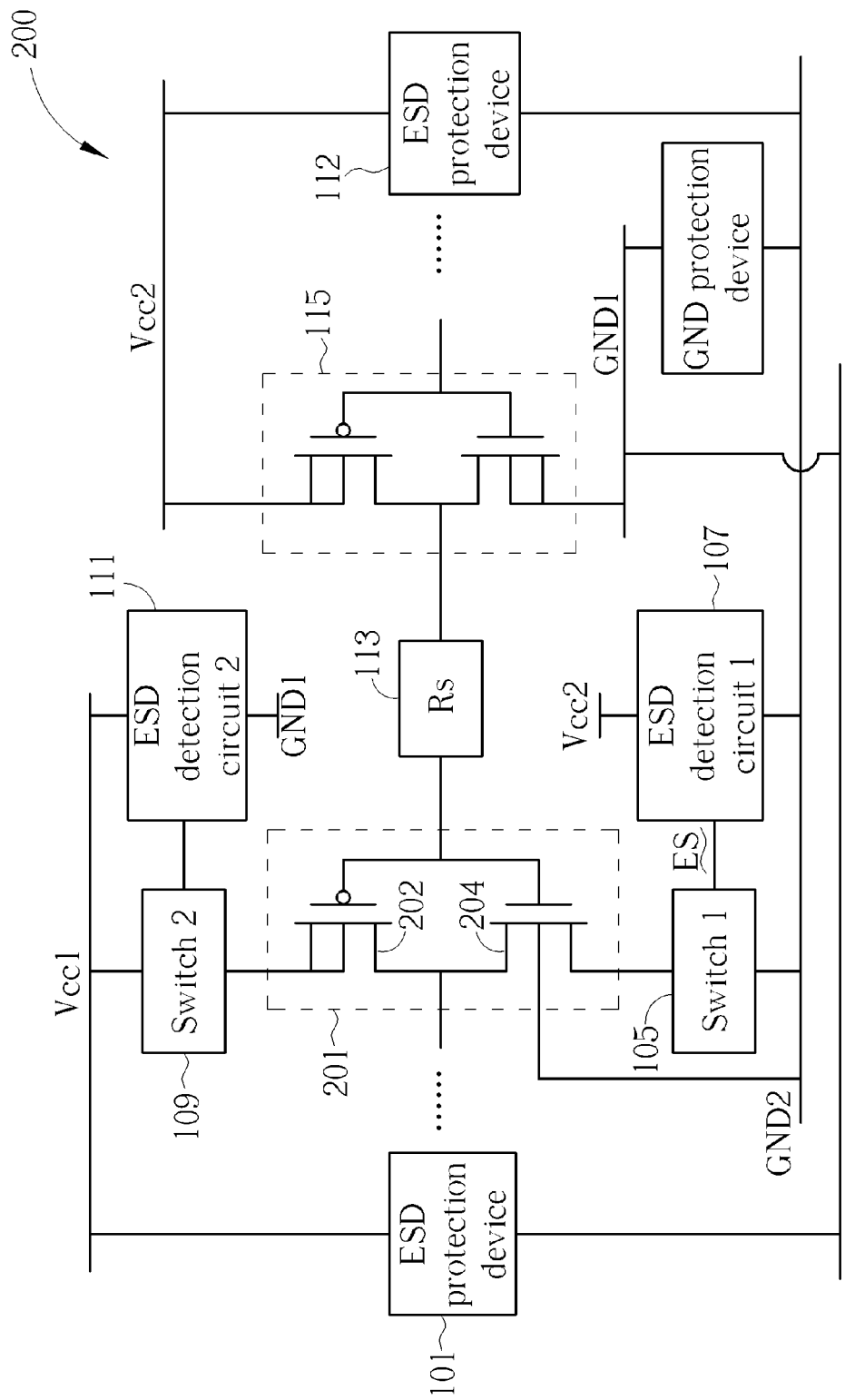

The ESD protection circuit 200 with multiple domains in FIG. 2a has devices almost the same as which of the ESD protection circuit 100 with multiple domains in FIG. 1a. Besides, the first internal circuit 201 in the ESD protection circuit 200 with multiple domains also includes a PMOS 202 and a NMOS 204, the same as the first internal circuit 103 in the ESD protection circuit 100 with multiple domains. One of the differences is that the body of the NMOS 204 in FIG. 2a is directly coupled to the second ground line GND2, but the body of the NMOS 104 in FIG. 1a is directly coupled to a source terminal of the NMOS 104 and the first switch 105. Furthermore, if the structure shown in FIG. 1a is applied, the NMOS 104 can be practiced with a deep N well.

Figure 2B:
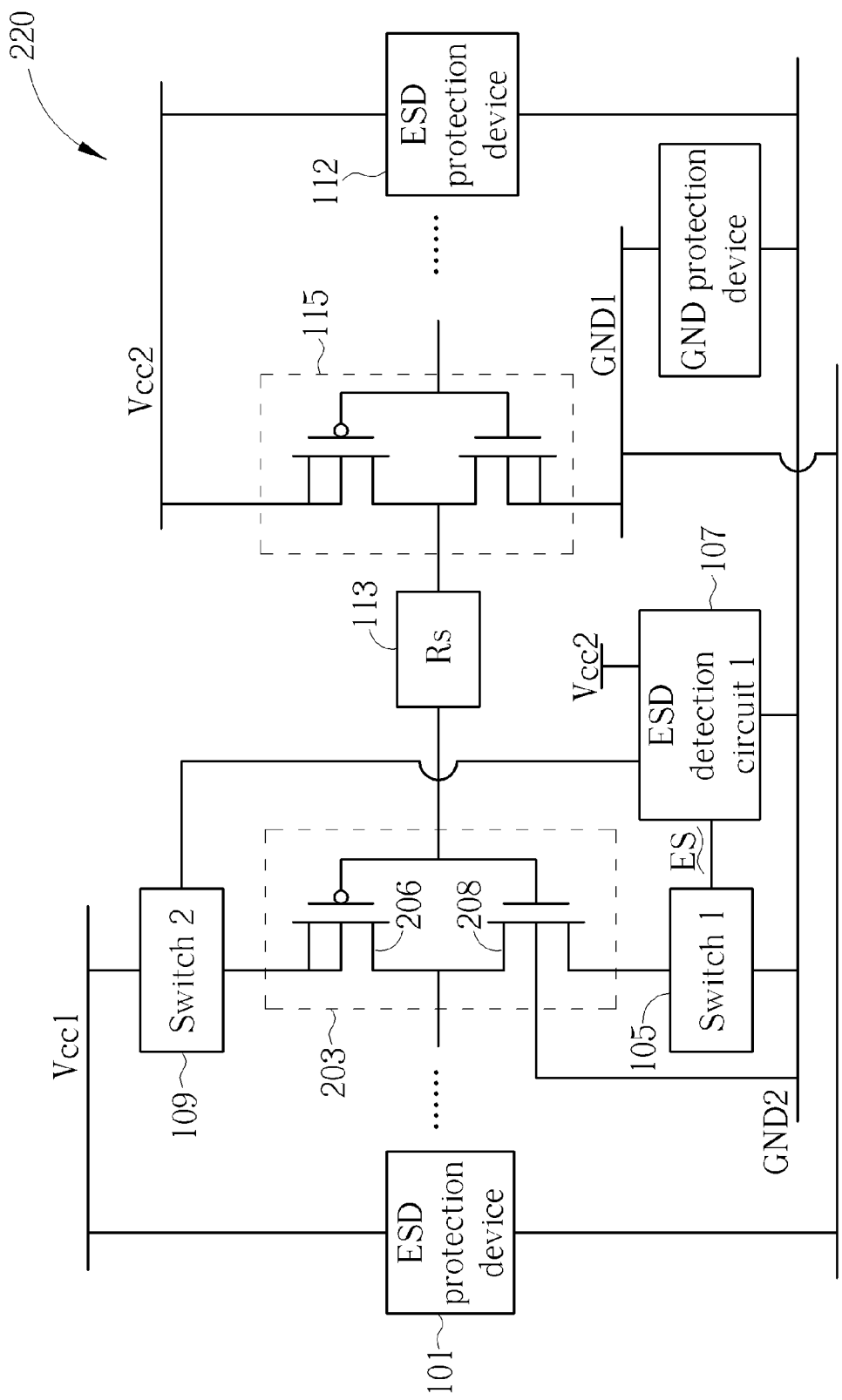

The ESD protection circuit 220 with multiple domains in FIG. 2a has devices almost the same as which of the ESD protection circuit 120 with multiple domains in FIG. 1b. Besides, the first internal circuit 203 in the ESD protection circuit 220 with multiple domains also includes a PMOS 206 and a NMOS 208, the same as the first internal circuit 103 in the ESD protection circuit 120 with multiple domains. One of the differences is that the body of the NMOS 208 in FIG. 2b is directly coupled to the second ground line GND2, but the body of the NMOS 104 in FIG. 1a is directly coupled to a source terminal of the NMOS 104 and the first switch 105.

Figure 3A:
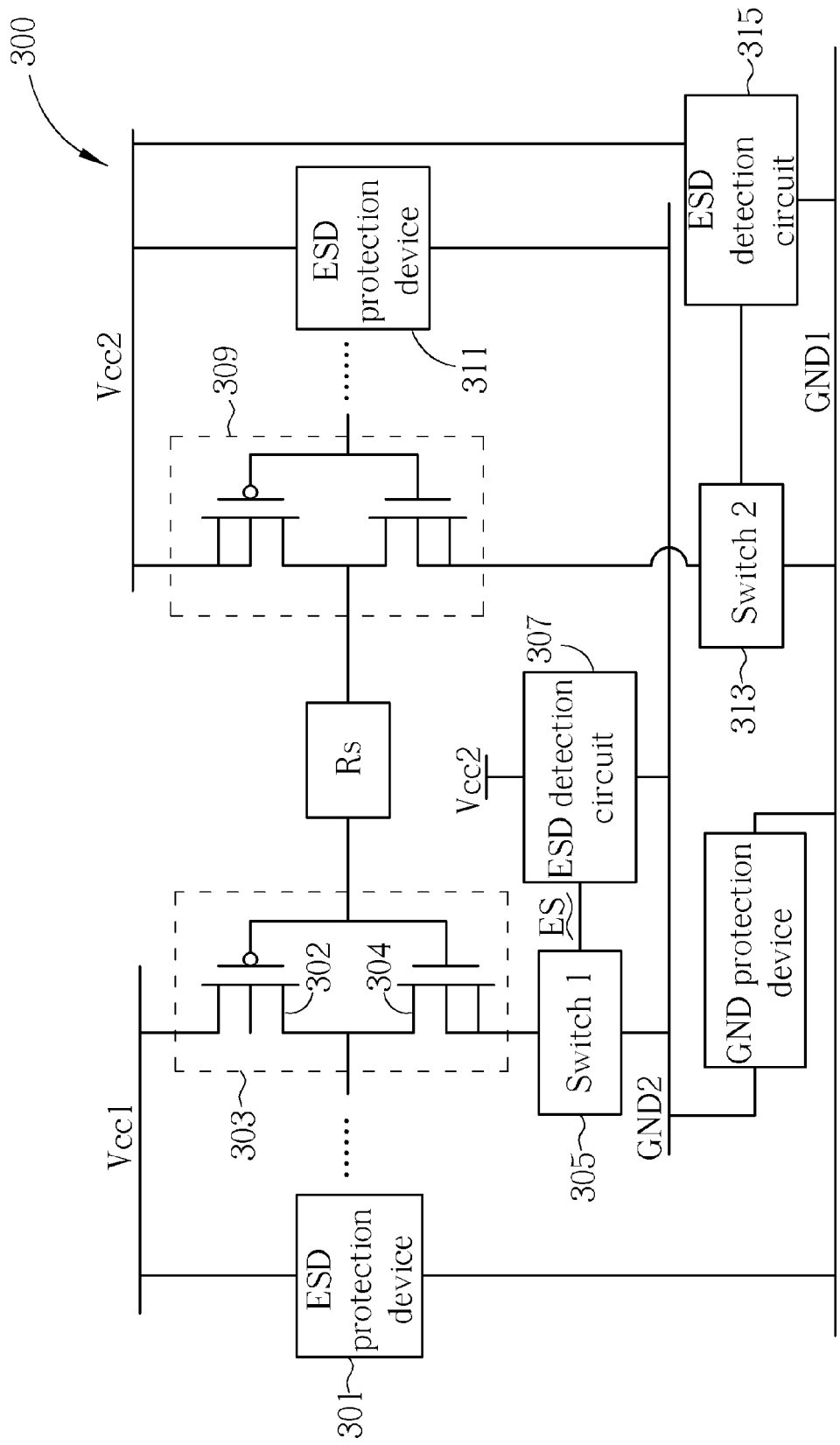
Figure 3B:
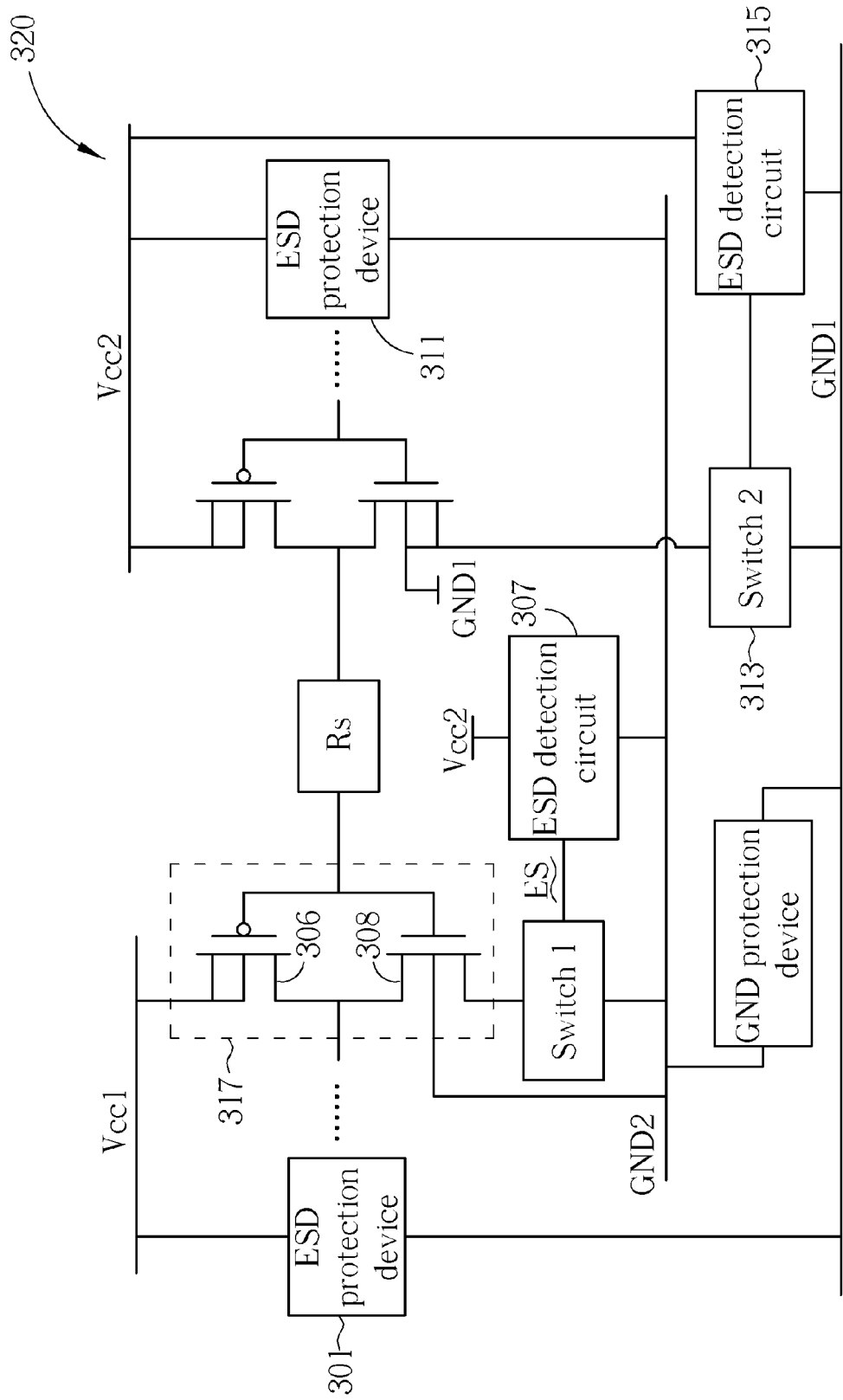

In the embodiments shown in FIGS. 3a and 3b, the internal circuit in each power domain utilizes a single switch and a single detection circuit for protection. As shown in FIG. 3a, the integration circuit with ESD protection mechanism 300 includes: an ESD protection device 301, an internal circuit 303, a switch 305 and an ESD detection circuit 307. Similarly, the ESD detection circuit 307 is coupled to the switch 305, for detecting an ESD signal (ex. a rush voltage or a rush current), and for controlling the switch 305 to be non-conductive when the ESD signal occurs. In the embodiment shown in FIG. 3a, an internal circuit 309 and the internal circuit 303 belong to different power domains, but the internal circuit 309 also includes a corresponding ESD protection device 311, a switch 313 and an ESD detection circuit 315. Also, the internal circuit 309 also includes the same operation as which of the internal circuit 303.

The ESD protection circuit 320 with multiple domains in FIG. 3b has devices almost the same as which of the ESD protection circuit 300 with multiple domains in FIG. 3a. Besides, the first internal circuit 317 in the ESD protection circuit 320 with multiple domains also includes a PMOS 306 and a NMOS 308, the same as the first internal circuit 303 in the ESD protection circuit 300 with multiple domains. One of the differences is that the body of the NMOS 308 in FIG. 3b is directly coupled to the second ground line GND2, but the body of the NMOS 304 in FIG. 3a is directly coupled to a source terminal of the NMOS 304 and the first switch 305.

Figure 4:
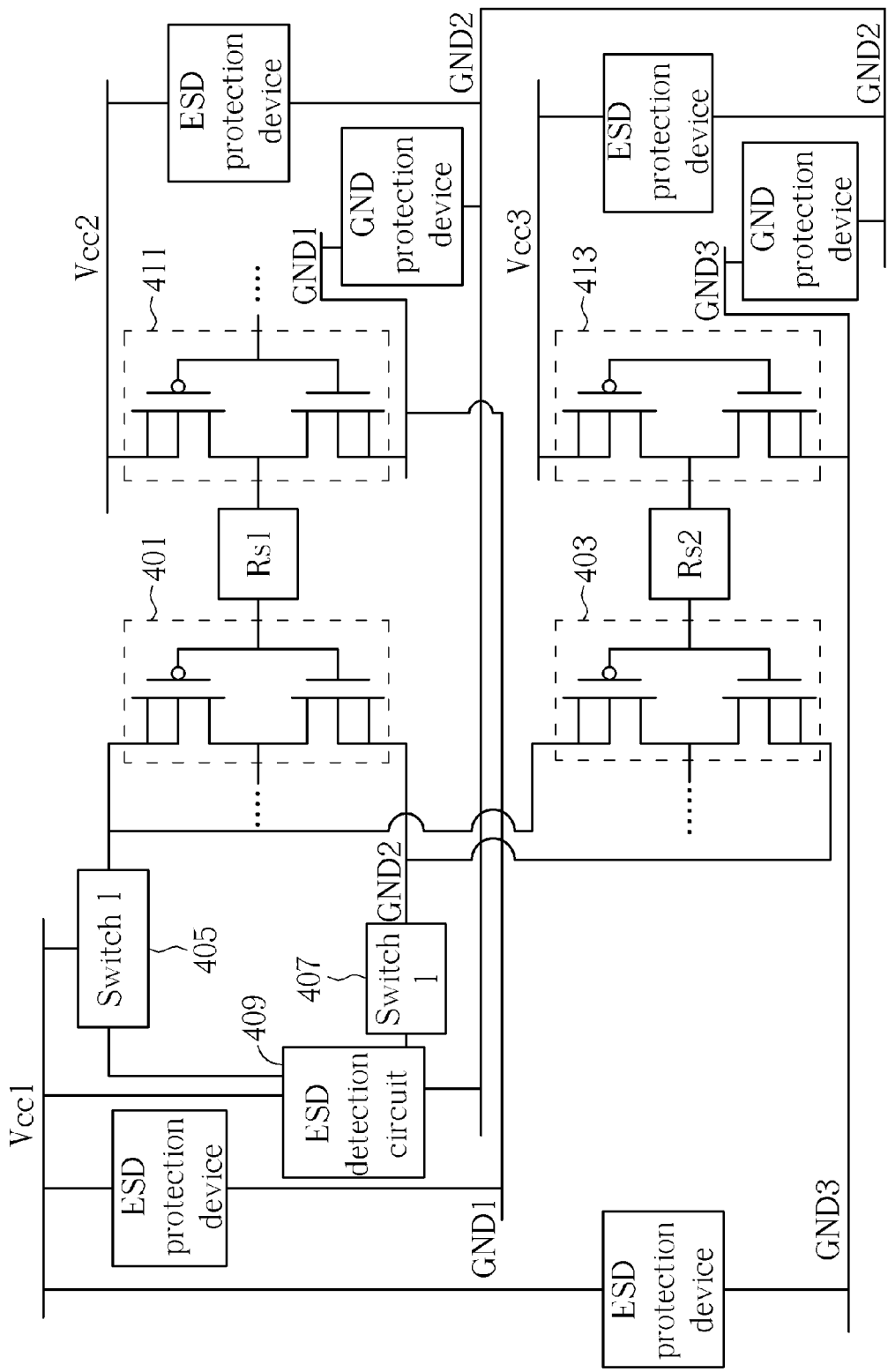

In the embodiment shown in FIG. 4, a plurality of the internal circuits can share a protection circuit including two switches and an ESD detection circuit. As shown in FIG. 4, internal circuits 401 and 403, which can be the internal circuits in the same power region, share the switches 405 and 407 as well as the ESD detection circuit 409. Accordingly, one ESD protection circuit is enough to prevent the ESD current from flowing to the internal circuits 411 and 413.

Figure 5A:
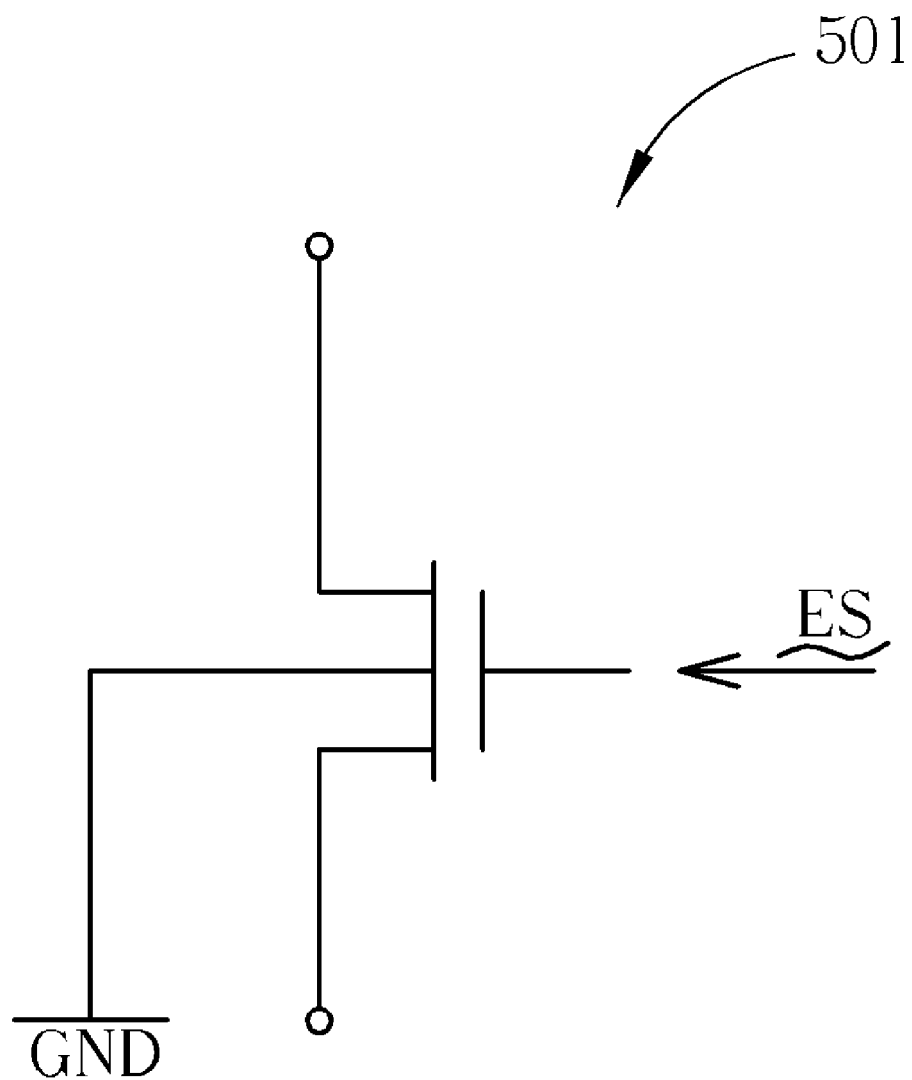
FIG. 5 illustrates an exemplary embodiment for the switches of the circuits shown in FIGS. 1-4.
Figure 5B:
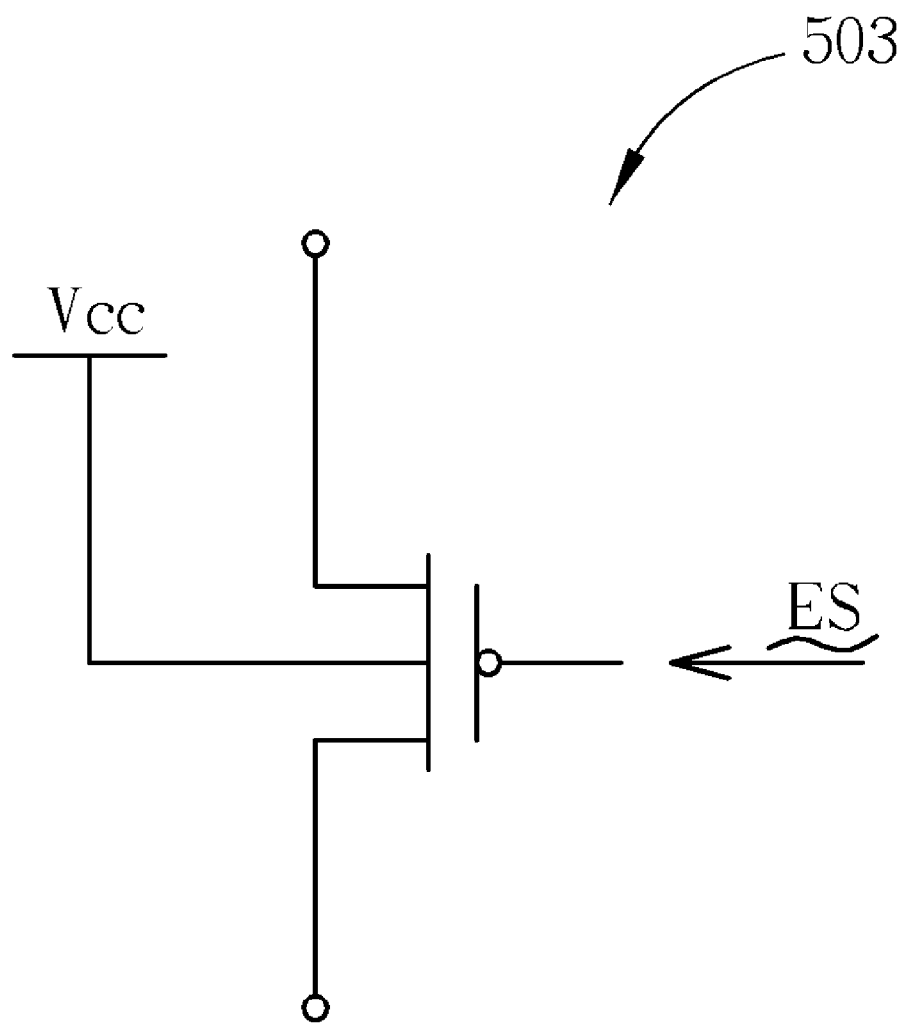

FIGS. 5a and 5b illustrate exemplary embodiments for the switches of the circuits shown in FIGS. 1a, 1b, 2a, 2b, 3a, 3b and 4. In FIG. 5a, a NMOS 501 is applied as a switch. A body of the NMOS 501 is coupled to a ground line, and a gate terminal thereof receives the ESD informing signal ES from the ESD detection circuit to be conductive or non-conductive. In FIG. 5b, a PMOS 503 is utilized as a switch. A body of the PMOS 503 is coupled to a power line, and a gate terminal thereof receives the ESD informing signal ES from the ESD detection circuit to be conductive or non-conductive.

Figure 6:
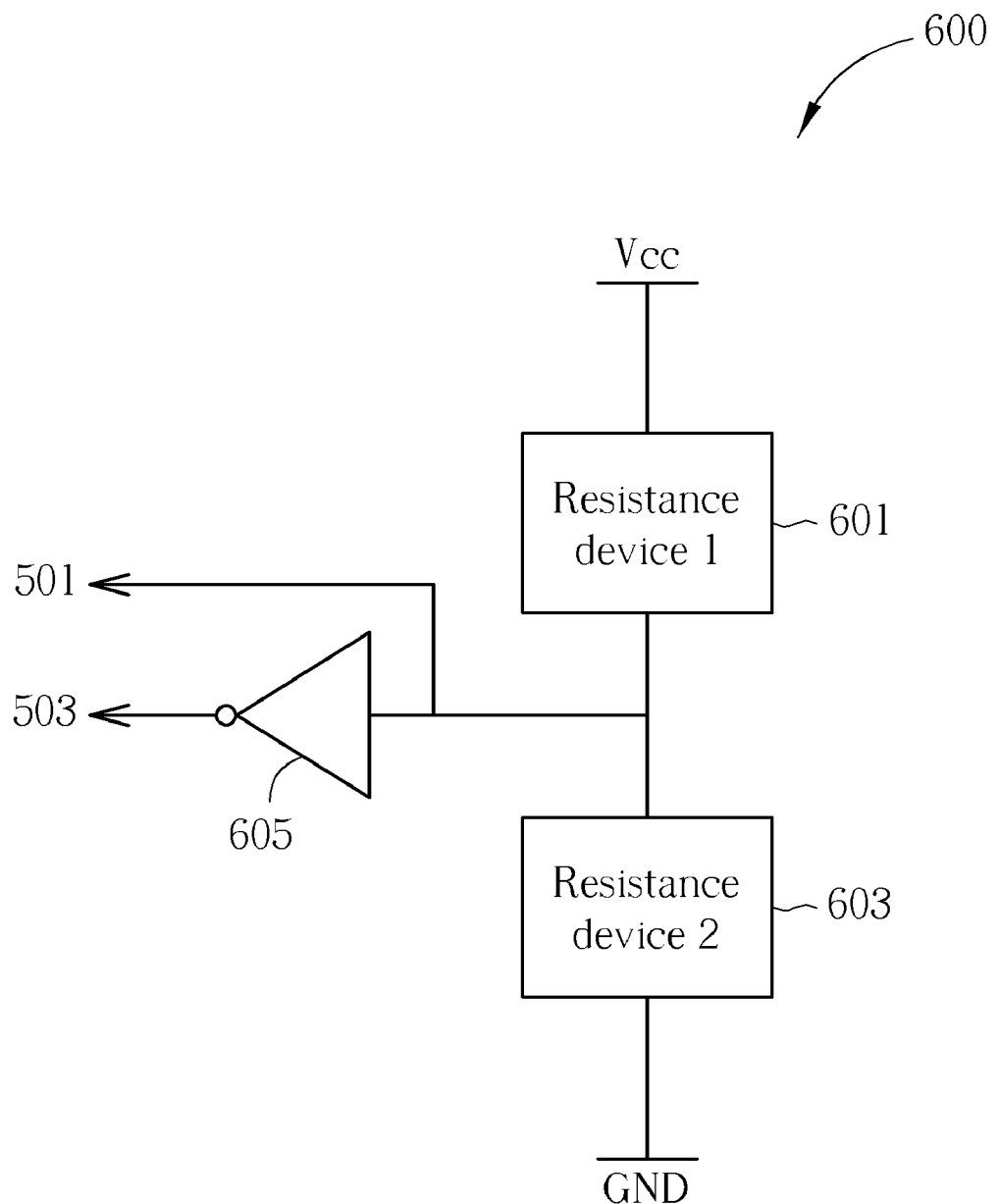
FIG. 6 illustrates an exemplary embodiment for the switches of the circuits shown in FIGS. 1-4.

FIG. 6 illustrates an exemplary embodiment for the switches of the circuits shown in FIGS. 1a, 1b, 2a, 2b, 3a, 3b and 4. As shown in FIG. 6, the ESD detection circuit 600 includes a first resistance device 601, a second resistance device 603 and an inverter 605. An input terminal of the inverter 605 is coupled to the NMOS 501 shown in FIG. 5a, and an output terminal of the inverter 605 is coupled to the PMOS 503 shown in FIG. 5b. Additionally, the first resistance device 601 and the second resistance device 603 can be implemented by a diode, a capacitor or a resistor.

Figure 7:
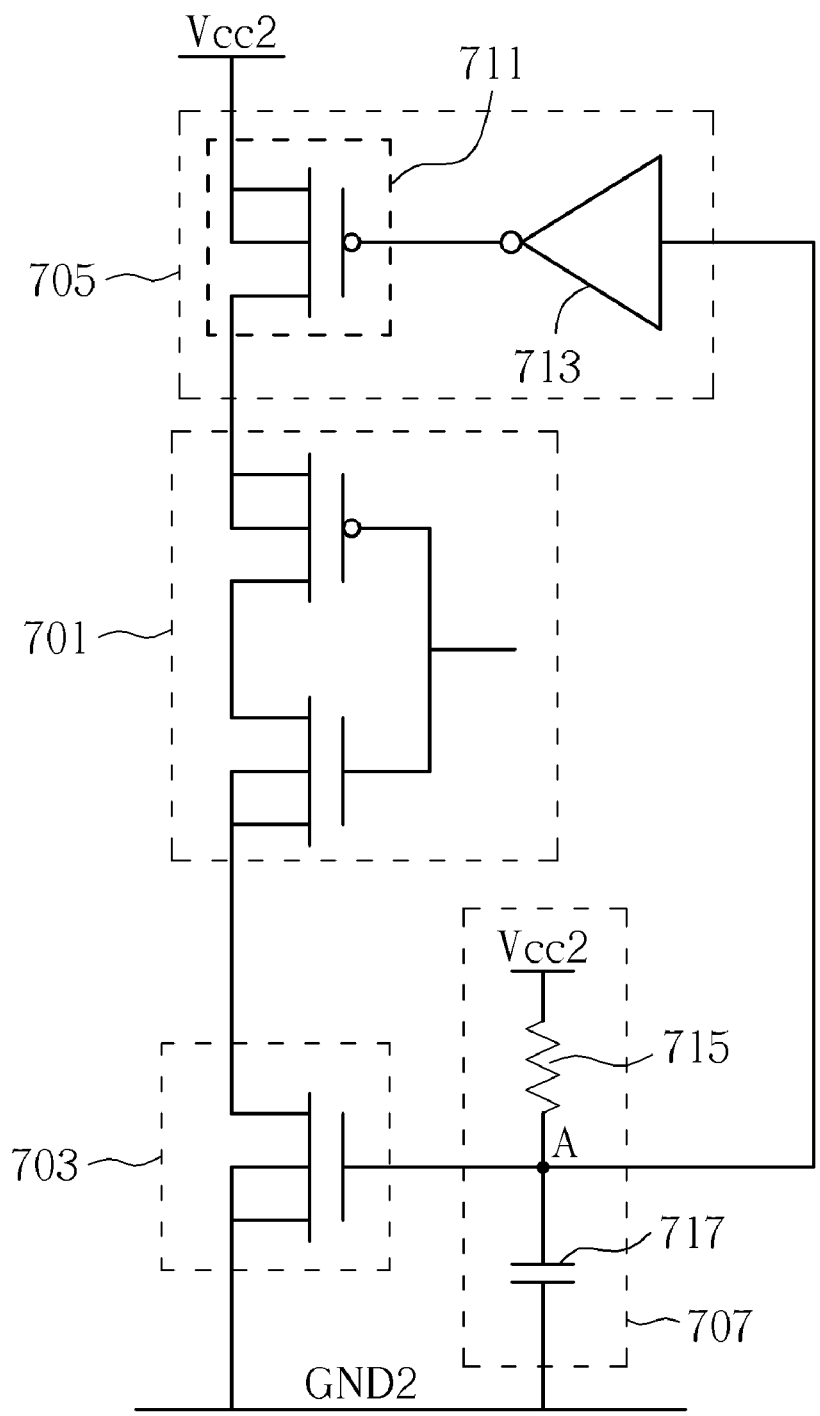
FIG. 7 illustrates a circuit diagram of an ESD protection circuit with multiple domains utilizes the structures shown in FIGS. 5-6.

FIG. 7 illustrates a circuit diagram of an ESD protection circuit 700 with multiple domains utilizes the structures shown in FIGS. 5a, 5b, and 6. As shown in FIG. 7, the ESD protection circuit 700 with multiple domains includes an internal circuit 701, a first switch 703, a second switch 705 and an ESD detection circuit 707. In this embodiment, the first switch 703 is a NMOS, the second switch 705 includes a PMOS 711 and an inverter 713, and the ESD detection circuit 707 includes a resistor 715 and a capacitor 717. In the normal situation, the power Vcc2 can charge the capacitor 717, such that the point A will keep at a high level state, as well as the first switch 703 and the second switch 705 become conductive. It should be noted that the structure shown in FIG. 7 is only for example and does not mean to limit the scope of the present application. Persons skilled in the art can vary the circuit structure to obtain the same results.

According to above-mentioned embodiments, the ESD protection mechanism for circuits of different power domains can be provided. Also, the protection device does not locate in signal transmission paths. By this way, the signal delay problem can be avoided.

Those skilled in the art will readily observe that numerous modifications and alterations of the device and method may be made while retaining the teachings of the invention.

What is claimed is:
1. An ESD protection circuit with multiple domains, wherein the ESD protection circuit comprises:
 a first ESD protection device coupled between a first power supplying line and a first ground line;
 a first internal circuit, having a first terminal coupled to the first power supplying line;

a first switch, coupled between a second terminal of the first internal circuit and a second ground line, wherein the second ground line is different from the first ground line, a first ESD detection circuit, coupled between a second power supplying line and the second ground line, coupled to the first switch, for detecting an ESD signal, and controls the first switch to be non-conductive when the ESD signal occurs, wherein the second power supplying line is different from the first power supplying line, a second internal circuit, coupled between the second power supplying line and the first ground line; and a second ESD protection device, coupled between the second power supplying line and the second ground line.

2. The ESD protection circuit of claim 1 further comprising:

a second switch, coupled between the first terminal of the first internal circuit and the first power supplying line; and a second ESD detection circuit, coupled between the first power supplying line and the first ground line, coupled to the second switch, for detecting an ESD signal, and for controlling the second switch to be non-conductive when the ESD signal Occurs.

3. The ESD protection circuit of claim 1, wherein the first switch is a NMOS, and a body of the first switch is directly connected to a source terminal of the first switch.

4. The ESD protection circuit of claim 3, wherein the first switch comprises a deep N well distribution layer.

5. The ESD protection circuit of claim 1, wherein the first switch is a NMOS, and a body of the first switch is directly connected to the second ground line.

6. The ESD protection circuit of claim 1, further comprising a second switch that is coupled between the first terminal of the first internal circuit and the first power line, and is coupled to the first ESD detection circuit as well, wherein the first ESD detection circuit controls the second switch to be non conductive when the ESD signal occurs.

7. The ESD protection circuit of claim 1, further comprising:

a signal transmission path, coupled between the first internal circuit and the second internal circuit.

8. An integration circuit with rush current protection mechanism, comprising:

a first circuit to be protected, having a first terminal coupled to a first power supplying line;

a first switch, coupled between a second terminal of the first circuit to be protected and a second ground line;

a first rush current detection circuit, coupled between a second power supplying line and the second ground line, coupled to the first switch, for detecting an ESD signal, and controls the first switch to be non-conductive when the ESD signal occurs, wherein the second power supplying line is different from the first power supplying line; and a second circuit to be protected, coupled between the second power supplying line and a first ground line, wherein the second ground line is different from the first ground line.

9. The integration circuit with rush current protection mechanism of claim 8, further comprising:

a second switch, coupled between the first terminal of the first circuit to be protected and the first power supplying line; and a second rush current detection circuit, coupled between the first power supplying line and the first ground line, coupled to the second switch, for detecting an ESD signal, and for controlling the second switch to be non-conductive when the ESD signal occurs.

10. The integration circuit with rush current protection mechanism of claim 8, wherein the first switch is a NMOS, and a body of the first switch is directly connected to a source terminal of the first switch.

11. The integration circuit with rush current protection mechanism of claim 10, wherein the first switch comprises a deep N well distribution layer.

12. The integration circuit with rush current protection mechanism of claim 8, wherein the first switch is a NMOS, and a body of the first switch is directly connected to the first ground line.

13. The integration circuit with rush current protection mechanism of claim 8, further comprising a second switch that is coupled between the first terminal of the first circuit to be protected and the first power supplying line, and is coupled to the first rush current detection circuit as well, wherein the first rush current detection circuit controls the second switch to be non conductive when the ESD signal occurs.

14. The integration circuit with rush current protection mechanism of claim 8, comprising:

a signal transmission path, coupled between the first circuit to be protected and the second circuit to be protected.

* * * * *